Feb. 3, 1953        L. G. COPEMAN        2,627,423
TRACTOR HITCH
Filed April 23, 1949
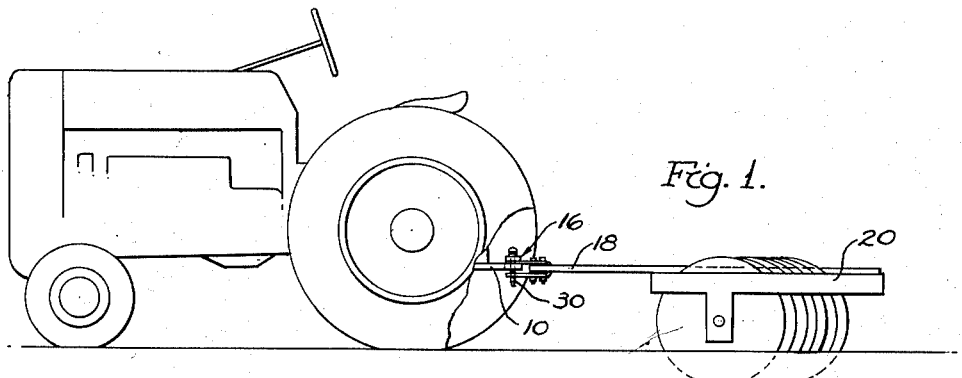
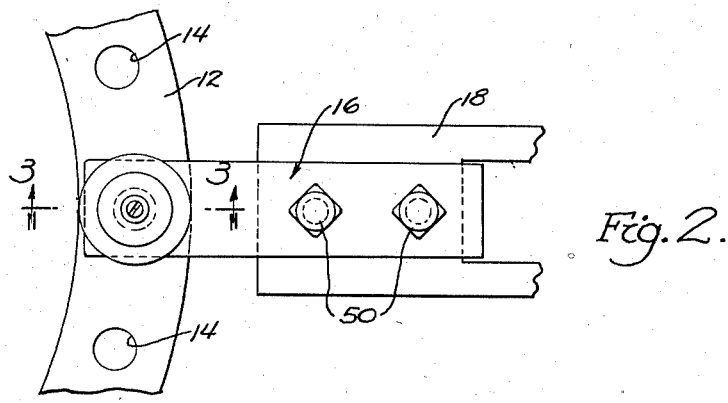
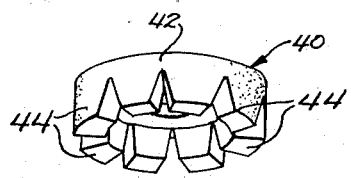
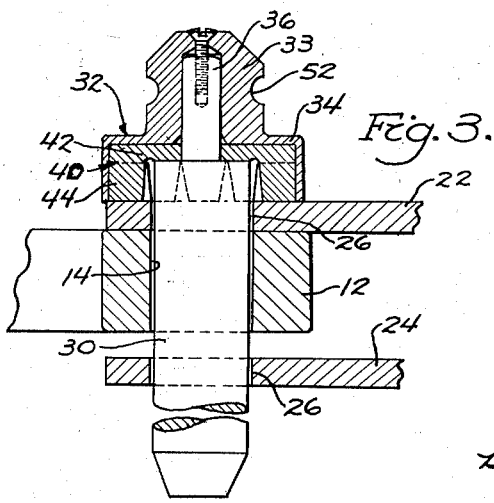
INVENTOR.
Lloyd G. Copeman
BY
Barnes, Kisselle, Laughlin & Raisch
ATTORNEYS.

Patented Feb. 3, 1953

2,627,423

UNITED STATES PATENT OFFICE 2,627,423

TRACTOR HITCH

Lloyd G. Copeman, Metamora, Mich., assignor to Copeman Laboratories Company, Flint, Mich., a corporation of Michigan Application April 23, 1949, Serial No. 89,228

4 Claims. (Cl. 280—33.15)

This invention relates to a tractor hitch.

Modern farm tractors are used to pull many farm implements, and it is essential that a convenient means be provided to hitch these implements to the tractor in a way which will insure positive connection which may be readily released at the will of the operator. Usually, tractors are provided with a hitch bar which is a U-shaped member horizontally disposed and fastened to the rear of the tractor. This hitch bar has a plurality of holes along the projecting base of the U, and a yoke spans these holes and is held in place by a pin passing through the yoke and the bar. It has been customary to have this pin held in place by gravity, and in some cases, by a use of a transfixing cotter pin, a bolt, or by screw nuts, but much difficulty has been experienced by reason of the pin jarring loose during movement of the tractor.

Briefly, the present invention contemplates an improved type of bolt for use with this type of tractor hitch, the bolt having a magnetic head which holds it securely in place regardless of the angle of pull or roughness of terrain.

Details of the construction will be described in the following specification and claims.

In the drawings:

Figure 1 shows a tractor and a disc harrow connected together by the hitch to be described.

Figure 2 is a detailed view of the hitch.

Figure 3 is a sectional view on line 3—3 of Figure 2.

Figure 4 is a perspective view of the magnet used in the head of the bolt.

Referring to the drawings, a conventional U bar 10 having a bight portion 12 is shown provided with perforations 14. A conventional yoke 16 is shown fastened to the draw bar 18 on the implement, which in this case is a disc harrow 20. The yoke has two legs 22 and 24 vertically spaced apart a greater distance than the width of the bar 12 and is provided with aligned holes 26 of substantially the same dimension as the holes 14 and the hitch bar. In fastening the hitch, the yoke is placed astraddle of the bar 12, and a pin 30 is passed through the yoke and the bar. The pin 30 is preferably formed of non-magnetic material and has a head portion 32 which consists of a handle 33 enlarged into a housing portion 34 and held in place over a stud extension 36 on the pin 30. Surrounding the top of the pin 30 is a circular magnet 40 having a disc-like top portion 42 and a plurality of axially projecting fingers 44 spaced circumferentially around the disc 42.

The yoke 16 is formed of magnetic material, and it will be seen that the bight of the yoke passes around the end portion of the draw bar 18 and is held in place by bolts 50. When the bolt 30 is passed through the hitch and allowed to drop in place, each of the extensions 44 becomes an individual magnet to attract the head 32 of the bolt to the leg 22 of the yoke 16. The space between the extensions 44 will form a temporary lodging place for stones or dirt, thus permitting full surface contact with the yoke. Thus, the bolt cannot be dislodged by jarring of the vehicles as they pass over the ground. It is possible to dislodge the bolt by an intentional pull on the head. If desired, a rope or wire may be passed around the head 33 in the groove 52 so that the bolt may be controlled from the seat of the tractor. The groove 52 will also cooperate with a clamp or tongs to be manipulated by the operator from the seat of the tractor.

As stated above the pin 30 is preferably of non-magnetic material, the advantage being that the holding magnet will not transmit forces down the pin to create magnetic pull which would make it difficult to thread the pin due to attraction to the walls of the yoke 16.

What I claim is:

1. A pin for connecting two apertured parts of a hitch assembly which comprises a shaft of non-magnetic material, an enlarged head formed on said shaft, and a magnet positioned within said head to co-operate with magnetic material in one of said parts.

2. A pin for connecting two apertured parts of a hitch, one of which parts is formed of magnetic material, said pin comprising a shaft of non-magnetic material and one or more magnets positioned in the head of said pin to create an attraction between said head and said magnet apertured part.

3. A pin for connecting two apertured parts which comprises a shaft of non-magnetic material and a head formed of a disc magnet having axial projections spaced circumferentially around said shaft.

4. A connecting pin as described in claim 3 in which a non-magnetic housing is provided surrounding the magnet, having an upwardly projecting stud, grooved annularly.

LLOYD G. COPEMAN.

REFERENCES CITED

The following references are of record in the file of this patent:

UNITED STATES PATENTS

| Number | Name | Date |
|---|---|---|
| Re. 14,551 | Ames | Nov. 19, 1918 |
| 854,196 | Brown | May 21, 1907 |
| 1,198,227 | Hinchey | Sept. 12, 1916 |
| 2,203,580 | Ronning | June 4, 1940 |
| 2,360,928 | Beechlyn | Oct. 24, 1944 |

FOREIGN PATENTS

| Number | Country | Date |
|---|---|---|
| 118,953 | Australia | Sept. 28, 1944 |